US 6,746,725 B2

(12) United States Patent  
Nakamuta et al.

(10) Patent No.: US 6,746,725 B2
(45) Date of Patent: Jun. 8, 2004

(54) ACRYLIC FOAM PRESSURE SENSITIVE ADHESIVE METHOD THEREOF

(75) Inventors: Shojitsu Nakamuta, Tokyo (JP); Hiroshi Kikuchi, Yamato (JP); Shinji Abiko, Sagae (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/344,309

(22) PCT Filed: Aug. 31, 2001

(86) PCT No.: PCT/US01/27333

§ 371 (c)(1),
(2), (4) Date: Feb. 10, 2003

(87) PCT Pub. No.: WO02/18511

PCT Pub. Date: Mar. 7, 2002

(65) Prior Publication Data

US 2003/0211250 A1 Nov. 13, 2003

(51) Int. Cl.$^7$ .................................................. B05D 3/00
(52) U.S. Cl. ..................... 427/565; 427/208.4; 427/243
(58) Field of Search ............................. 427/565, 208.4, 427/243

(56) References Cited

FOREIGN PATENT DOCUMENTS

| EP | 0 084 220 A1 | 7/1983 | .............. C09J/7/00 |
| JP | 3-40752 | 6/1991 | .............. C09J/7/02 |

Primary Examiner—Bernard Pianalto
(74) Attorney, Agent, or Firm—Jean A. Lown (57) ABSTRACT

An acrylic foam pressure sensitive adhesive, having a low density and having cells finely and uniformly dispersed therein, and its production method. An acrylic foam pressure sensitive adhesive having a cell average diameter of no more than 300 $\mu$m and its standard deviation of no more than 115 $\mu$m. A production method of an acrylic foam pressure sensitive adhesive comprising: introducing an acrylic foam precursor composition and a cell forming gas into an agitation and mixing apparatus equipped with a casing provided with a flow path through which a fluid flows, and agitation blades disposed within said casing capable of vibrating in the axial direction of said casing, forming cells within the acrylic foam precursor composition by agitating and mixing the acrylic foam precursor composition and the cell forming gas in the agitation and mixing apparatus, coating the acrylic foam precursor composition containing the cells onto a substrate, and curing the coated acrylic foam precursor composition.

21 Claims, 8 Drawing Sheets

Fig. 8

ACRYLIC FOAM PRESSURE SENSITIVE ADHESIVE METHOD THEREOF

FIELD OF THE INVENTION

The present invention relates to an acrylic foam pressure sensitive adhesive, particularly, an acrylic foam pressure sensitive adhesive, having a low density and having cells finely and uniformly dispersed therein and, more particularly, an acrylic foam pressure sensitive adhesive having a cell average diameter of no more than 300 µm and its standard deviation of no more than 115 µm, and a method of production thereof.

BACKGROUND OF THE INVENTION

Acrylic foam pressure sensitive adhesives have been produced by chemical foaming methods in which a foaming agent is foamed in an acrylic solution prior to curing followed by its curing, or by mechanical foaming methods in which an inert gas such as nitrogen gas is dispersed and mixed into an acrylic solution prior to curing followed by its curing. Mechanical foaming methods can be superior in that the solution prior to coating can have high stability, the cell size can be easily controlled, the foam density can be easily controlled, cell uniformity can be comparatively high, closed cells can be formed having good sealing, the foam thickness can be easily controlled, and a foam can be obtained that is free of residues.

Foam pressure sensitive adhesives typically have superior cushioning, sealing and adhesion, etc. the lower the density and the greater the number of uniform cells. Consequently, in mechanical foaming methods, it is important to improve the performance of the process in which inert gas is finely and uniformly dispersed and mixed into the solution prior to curing. Methods currently used employ an apparatus equipped with a stator having a large number of fine teeth on a disk having a through hole in its center, and a rotor positioned in opposition to the stator having a large number of fine teeth similarly having a large number of fine teeth on a disk. By passing the acrylic solution prior to curing and cell forming gas (e.g., nitrogen gas) from the through hole into the gaps between the teeth on the stator and the teeth on the rotor, and rotating the rotor at high speed, the cell forming gas is finely dispersed and mixed into the acrylic solution. According to the method of the prior art which uses this apparatus (to be referred to as the "apparatus of the prior art"), the average diameter of the cells of the resulting foam typically exceed 300 µm, and its standard deviation exceeds 115 µm. In addition, the foam density is no less than about 0.60 (g/cc) even in the lowest cases.

SUMMARY OF THE INVENTION

An object of the present invention is to provide an acrylic foam pressure sensitive adhesive having a low density and in which the cells are finely and uniformly dispersed unlike that obtained with the method of the prior art.

In one aspect of the present invention, an acrylic foam pressure sensitive adhesive is provided having a cell average diameter of no more than 300 µm and its standard deviation of no more than 115 µm.

In another aspect of the present invention, a method for producing an acrylic foam pressure sensitive adhesive is provided that comprises introducing an acrylic foam precursor composition and a cell forming gas into an agitation and mixing apparatus equipped with a casing provided with a flow path through which a fluid flows, and agitation blades disposed within said casing being capable of vibrating in the axial direction of said casing, forming cells within the acrylic foam precursor composition by agitating and mixing the acrylic foam precursor composition and the cell forming gas in the agitation and mixing apparatus, coating the acrylic foam precursor composition containing the cells onto a substrate, and curing the coated acrylic foam precursor composition.

An acrylic foam pressure sensitive adhesive is obtained by the above specific agitation and mixing apparatus that uses the vibration principle (to be referred to as a vibrating agitation and mixing apparatus). This foam pressure sensitive adhesive has higher adhesive strength and cushioning as compared with foam pressure sensitive adhesives of the prior art, and consequently has superior sealing and sticking capabilities.

BRIEF DESCRIPTION OF THE DRAWINGS

FIG. 5 is a graph showing the relationship of liquid density before curing and foam tape density after curing vs the volume percentage of the amount of nitrogen gas mixed in.

DETAILED DESCRIPTION OF THE INVENTION

The acrylic foam precursor composition contains a syrup in which a polymerizable mixture containing monomers that include acrylic acid and/or acrylate ester (to be referred to as (meth)acrylate) is partially polymerized to a viscosity to the extent that the precursor composition can contain stable cells. The (meth)acrylate normally has an alkyl group having no more than 12 carbons, specific examples of which include n-propyl(meth)acrylate, n-butyl(meth)acrylate, n-amyl (meth)acrylate, n-hexyl(meth)acrylate, 2-ethylhexyl(meth) acrylate, n-octyl(meth)acrylate, isooctyl(meth)acrylate and n-decyl(meth)acrylate. In addition, examples of other monomers polymerizable with the above acrylate monomers that can be used include acrylic acid, methacrylic acid, itaconic acid, vinyl acetate, hydroxyalkylacrylate, acrylamide and methacrylamide. These monomers are used in an adequate amount for imparting pressure sensitive adhesion to the acrylic foam, and the amount, without particular restrictions, is typically at no more than 30 parts by weight relative to 100 parts by weight of (meth)acrylate.

Partial polymerization of the polymerizable mixture can be carried out by radiation-induced polymerization using ultraviolet light and so forth in the presence of a polymerization initiator. Examples of polymerization initiators that can be used include benzoin alkyl ether, benzophenone, benzyl methyl ketal, hydroxycyclohexyl phenyl ketone, 1,1- dichloroacetophenone and 2-chlorothioxantone. Examples of commercially available polymerization initiators include products sold under the trade names IRGACURE® manufactured by Ciba Specialty Chemicals, DAROCURE® manufactured by Merck Japan and VERSICURE manufactured by Versicore. The polymerization initiator is typically used in an amount of about 0.01 to 5 parts by weight relative to 100 parts by weight of monomer.

However, partial polymerization is not limited to radiation-induced polymerization, and can also be carried out by thermal polymerization.

An acrylic foam precursor composition is obtained by additionally adding other components as necessary to the syrup obtained by partial polymerization. The acrylic foam precursor composition should have a viscosity that is suitable for forming stable cells in the precursor composition when the cell forming gas is agitated and mixed. The precursor composition preferably has a viscosity of no less than 500 mPa·s, and particularly 1000 to 100,000 mPa·s, at the operating temperature of the agitation and mixing apparatus (e.g., 25° C.). If the viscosity is less than 500 mPa·S, cells may not be formed, and even if they are formed, since they disappear due to cells combining and rising, there is the risk of being unable to obtain an adequate amount of cells. Conversely, if the viscosity exceeds 100,000 mPa·s, flow in the agitation and mixing apparatus is inhibited, thereby resulting in the risk of the load applied to the apparatus becoming excessively large.

The acrylic foam precursor composition can contain a slight amount of multifunctional (meth)acrylate such as 1,6-hexanediol diacrylate. Such monomers impart a crosslinked structure to the acrylic polymer after curing and have the effect of contributing to foam cohesion. In addition, a polymerization initiator may be added for curing by further polymerization of the precursor composition. The polymerization initiator and its amount are the same as the case of partial polymerization described above.

The acrylic foam precursor composition preferably contains surfactant in order to satisfactorily maintain cell stability as well as promote lower density of the resulting foam. Examples of surfactants that can be used in the present invention include silicone surfactants and fluorine surfactants; including that described in Japanese Examined Patent Publication (Kokoku) No. 3-40752, which is incorporated herein by reference in its entirety. More specifically, examples of silicone surfactants include DC-1250 (product name) manufactured by Dow-Corning, as well as SH192 (product name) and SH190 (product name) manufactured by Toray-Dow-Coming. SH-192 contains as its main components polydimethylsiloxane, in which the number average molecular weight (Mn) is $4.2 \times 10^5$, the weight average molecular weight (Mw) is $5.4 \times 10^5$ and the ratio of Mw/Mn is 1.3, and polyether siloxane, in which the number average molecular weight (Mn) is $4.6 \times 10^5$, the weight average molecular weight (Mw) is $6.4 \times 10^5$, and the ratio of Mw/Mn is 1.4. An example of a fluorine surfactant is $C_8F_{17}SO_2N(C_2H_5)(C_2H_4O)_7CH_3$. In the case of using a vibrating agitation and mixing apparatus in the present invention, high cell stabilization effects and low density effects are obtained in comparison with using an apparatus of the prior art. Namely, the amount of surfactant can be reduced as compared with methods of the prior art. In addition, since satisfactory dispersion is possible even with a large amount of cell forming gas, it is possible to obtain a low-density foam. The amount of surfactant used is normally 1 to 5 parts by weight per 100 parts by weight of foam precursor composition.

The precursor composition may contain a filler for the purpose of enhancing the dynamic performance of the foam pressure sensitive adhesive after curing, improving processability or lowering the finished product unit price. Examples of fillers include reinforcing thread, woven and non-woven fabric, glass beads, plastic hollow microspheres and beads, and pigment.

The cell forming gas is an inert gas with respect to the precursor composition when mixed with the acrylic foam precursor composition. There are no restrictions on the cell forming gas, and although inert gases such as argon and nitrogen can be used, nitrogen gas is used preferably in consideration of costs. Although there are no restrictions on the amount of cell forming gas provided the foam has uniform, fine cells, it is usually mixed in an amount of 10 to 30% by volume based on the volume of the foam precursor composition.

Figure 1:
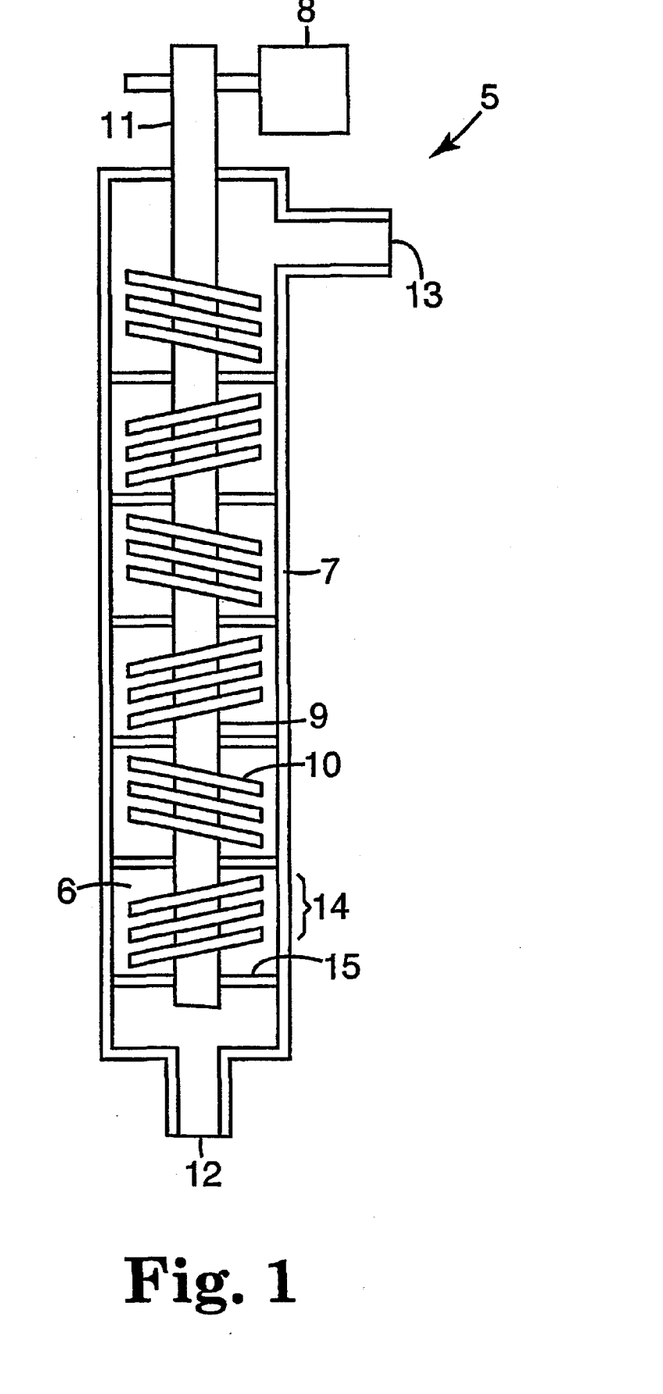
FIG. 1 is a cross-sectional view of one mode of the agitation and mixing apparatus used in the present invention.
Figure 2:
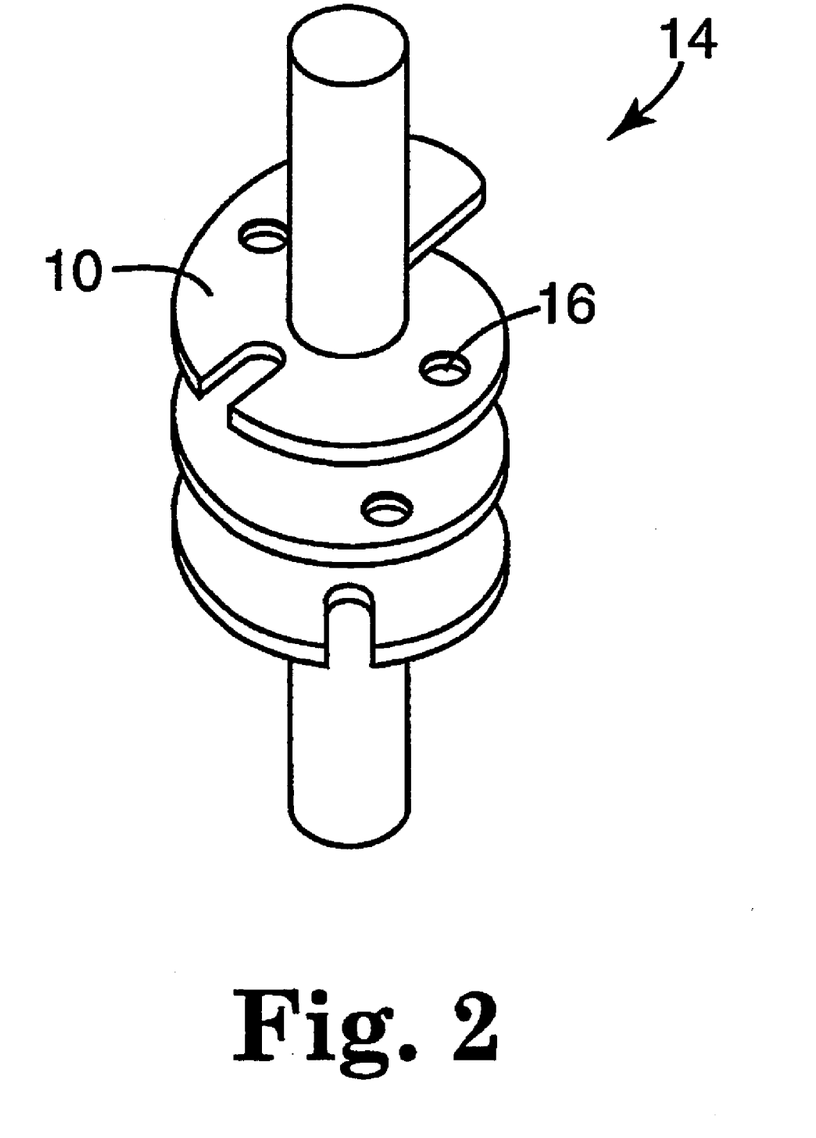
FIG. 2 is a perspective view of an agitation element of the apparatus of FIG. 1.

The foam pressure sensitive adhesive of the present invention is characterized by being produced using an agitation and mixing apparatus that uses the vibration principle instead of an apparatus of the prior art. When such an apparatus is used, shearing force applied to the foam precursor composition efficiently contributes to cell dispersion. Consequently, fine, uniformly dispersed cells can be obtained without inviting a temperature increase of the composition. In the present invention, an agitation and mixing apparatus is used equipped with a casing provided with a flow path through which a fluid flows, and agitation blades disposed within said casing capable of vibrating in the axial direction of said casing. FIG. 1 shows a cross-sectional view of one mode of an apparatus preferably used in the method of the present invention. Agitation and mixing apparatus 5 contains agitator 11 comprised of casing 7 in which flow path 6 is provided, shaft 9 disposed within this casing 7 and connected to vibration source 8, and spiral agitation blades 10 attached around this shaft 9. Acrylic foam precursor composition is introduced into casing 7 through inlet 12 by pumping with a pump, while cell forming gas is introduced into casing 7 through inlet 12 by pumping with a compressor or by the pressure of a gas tank. After being agitated and mixed in apparatus 5, the precursor composition containing cells leaves from outlet 13. Since the cell forming gas tends to flow upwards due to buoyancy in the precursor composition, casing 7 is normally disposed so that the lengthwise direction is vertical so that cell bias does not occur, and the precursor composition and cell forming gas flow from the bottom to the top of casing 7. When agitator 11 vibrates in a reciprocating manner within this casing 7, the fluid collides with blades 10 causing it to be agitated and mixed. The amplitude and frequency of the vibrations can be adjusted from 0.5 to 5 cm and from 0 to 120 Hz, respectively. Agitator 11 preferably employs a constitution in which a plurality of agitation elements 14, which are composed of a group of a plurality of spiral blades 10 attached around shaft 9, are linked together. Agitator 11 more preferably employs a constitution in which agitation elements 14, which are composed of a group of left spiraling blades 10, and agitation elements 14, which are composed of a group of right spiraling blades 10, are disposed in alternating fashion. This is because such a constitution inhibits flow in the same direction resulting in satisfactory agitation. As shown in detail in FIG. 2, blades 10 are preferably provided with openings 16. This is because turbulence is generated due to fluid flowing through these openings 16 resulting in enhanced agitation effects. In a plurality of upper and lower blades 10, it is desirable that the position of the opening provided in the upper blade, and the position of the opening provided in the lower blade are shifted relative to the axial direction, since short circuit flow can be prevented. Moreover, as shown in FIG. 1, it is preferable that each agitation element 14 be separated by partitions 15 having flow through holes. This is because these partitions 15 inhibit the flow rate of the fluid during reciprocating vibration of agitator 11, thereby improving agitation and mixing effects.

The cell-containing acrylic foam precursor composition formed by the agitation and mixing apparatus is coated onto a substrate and then cured by carrying out an additional polymerization reaction to produce an acrylic foam pressure sensitive adhesive. The polymerization reaction can be carried out by ultraviolet light or other radiation. Since air tends to inhibit ultraviolet polymerization, polymerization is preferably carried out in an inert gas such as nitrogen or carbon dioxide. A plastic film such as a film composed of polyethylene terephthalate (PET) can be used for the substrate. A transparent film that is permeable to ultraviolet rays is advantageous for the substrate since irradiation of the precursor composition with ultraviolet rays can also be carried out from the substrate side.

In comparison with that obtained by methods using an apparatus of the prior art, a foam pressure sensitive adhesive produced according to the method of the present invention has uniform, fine cells resulting in a foam product having a satisfactory appearance. This is the result of using a specific agitation and mixing apparatus that employs the vibration principle. Namely, since the shearing force applied to the foam precursor composition during mixing effectively contributes to dispersion of the cells, there is no temperature rise of the precursor composition as in the case of the apparatus of the prior art, and as a result, combining of cells due to heat generation is inhibited thereby enabling the formation of fine, uniform and stable cells. More specifically, the cell average diameter of the foam pressure sensitive adhesive is no more than 300 $\mu$m, and its standard deviation is no more than 15 $\mu$m, and preferably, the cell average diameter is no more than 250 $\mu$m, and its standard deviation is no more than 100 $\mu$m. In addition, since fine, uniform and stable cells are formed, a larger amount of cell forming gas can be dispersed as compared with the methods of the prior art, thereby allowing the obtaining of a foam having low density. A low density foam is preferable because of its superior peel adhesive strength, adhesion and sealing. More specifically, the foam density can normally be no more than 0.6 g/cc, preferably no more than 0.55 g/cc, more preferably no more than 0.5 g/cc, and most preferably no more than 0.45 g/cc, while a foam having a density of about 0.40 g/cc can be obtained. Moreover, since the cells that are formed are more stable than in the methods of the prior art, the amount of surfactant required to obtain an equivalent appearance in the case of using a method of the prior art can be reduced.

The resulting acrylic foam pressure sensitive adhesive can be used as industrial sealants, pressure sensitive adhesives and so forth in the form of rolls, sheets, stamped products or straps.

EXAMPLES

Example 1

A mixture of 90 parts by weight of isooctylacrylate (IOA), 10 parts by weight of acrylic acid and 0.04 parts by weight of IRGACURE® 651 (2,2-dimethoxy-2-phenylacetophenone, Ciba Specialty Ltd.) was partially polymerized with ultraviolet light having a wavelength of 300 to 400 nm and intensity of 1 to 3 mW for 5 minutes in a nitrogen atmosphere to a syrup having a viscosity of 1000 to 3000 mPa·s. After adding 0.10 parts by weight of IRGACURE® 651, 1.5 parts by weight of Aerozil A-2000 (fine powder silica available from Japan Aerozil) and 6.0 parts by weight of Glass Bubble K-15 (3M) to the syrup and agitating, the mixture was de-aerated using a vacuum de-aerator followed by the addition of 3 parts by weight of surfactant ((B) of Japanese Examined Patent Publication (Kokoku) No. 3-40752) to obtain an acrylic foam precursor composition. This fluid was supplied to a vibrating agitation and mixing apparatus (apparatus inner diameter 64 mm×height 2 cm) at the flow rate of 100 to 500 cc/min with a pump. In addition, nitrogen gas was supplied at a prescribed flow rate with a flow rate control valve from a nitrogen gas tank at a pressure of 0.39 MPa. Furthermore, the foam precursor composition and nitrogen gas were merged at a portion immediately before the entrance in the bottom of the agitation and mixing apparatus, and supplied from the bottom of the agitation and mixing apparatus. The agitation and mixing apparatus was operated at an amplitude of 1 cm and frequency of 30 Hz. Gas and fluid were dispersed within the agitation and mixing apparatus and the cell-containing fluid that came out of the top of the agitation and mixing apparatus was coated onto PET film to a thickness after curing of 1.2 mm by gap coating. This was followed by curing by irradiation with ultraviolet light having a wavelength of 300 to 400 nm and intensity of 0.5 to 7 mW for 6 minutes in a nitrogen atmosphere to obtain an acrylic foam tape.

Comparative Example 1

Acrylic foam was produced in the same manner as Example 1 with the exception of using an apparatus of the prior art, equipped with two stators having a diameter of 250 mm and a large number of fine teeth at intervals of 1.5 mm on a disk provided with through holes having a diameter of 105 mm, and a rotor disposed between these stators having a large number of similar teeth on a disk having a diameter of 230 nm, at a shear rate of 100 to 4000/sec instead of the above-mentioned vibrating agitation and mixing apparatus.

Cell Diameter and Cell Uniformity Test

Figure 3A:
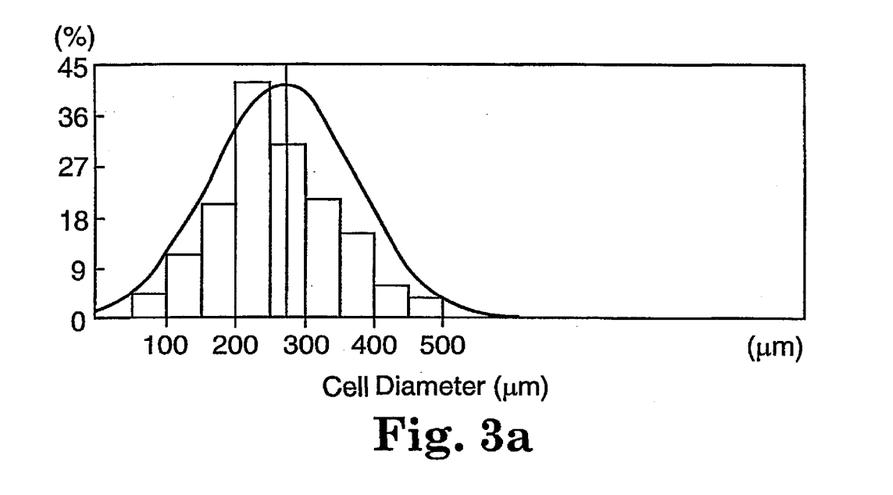
FIGS. 3a and 3b are graphs showing the distribution of foam cell diameter.
Figure 3B:
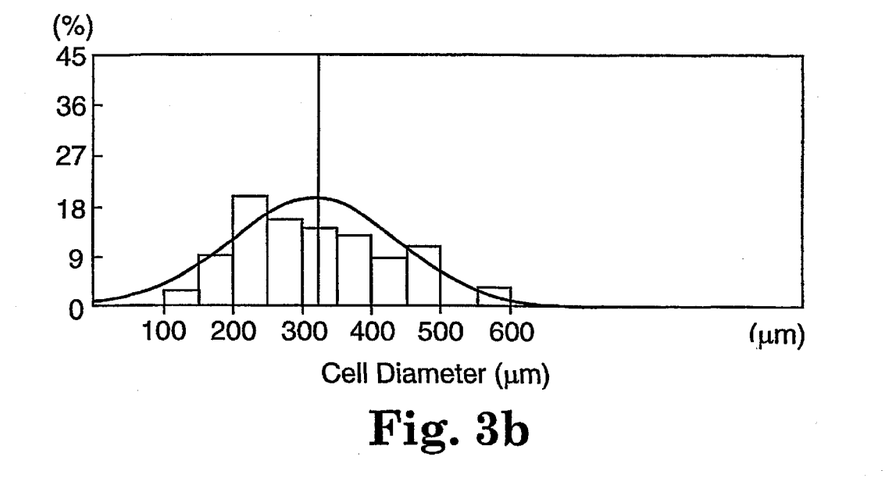

Graphs showing the distribution of cell diameter of the acrylic foams produced in the manner described above are shown in FIGS. 3(a) and 3(b) wherein the acrylic foam precursor compositions was mixed with a sufficient amount of nitrogen gas to obtain foams having a density after curing of 0.65 g/cc. FIG. 3(a) shows the results for the foam pressure sensitive adhesive of the present invention produced using a vibrating agitation and mixing apparatus, while FIG. 3b shows the results for a foam pressure sensitive adhesive of the prior art produced using an apparatus of the prior art. As is clear from a comparison of FIGS. 3a and 3b, in the case of using the vibrating agitation and mixing apparatus, a foam can be seen to be formed that contained uniform, fine cells as compared with the case of using the apparatus of the prior art.

Appearance Test

Figure 4:
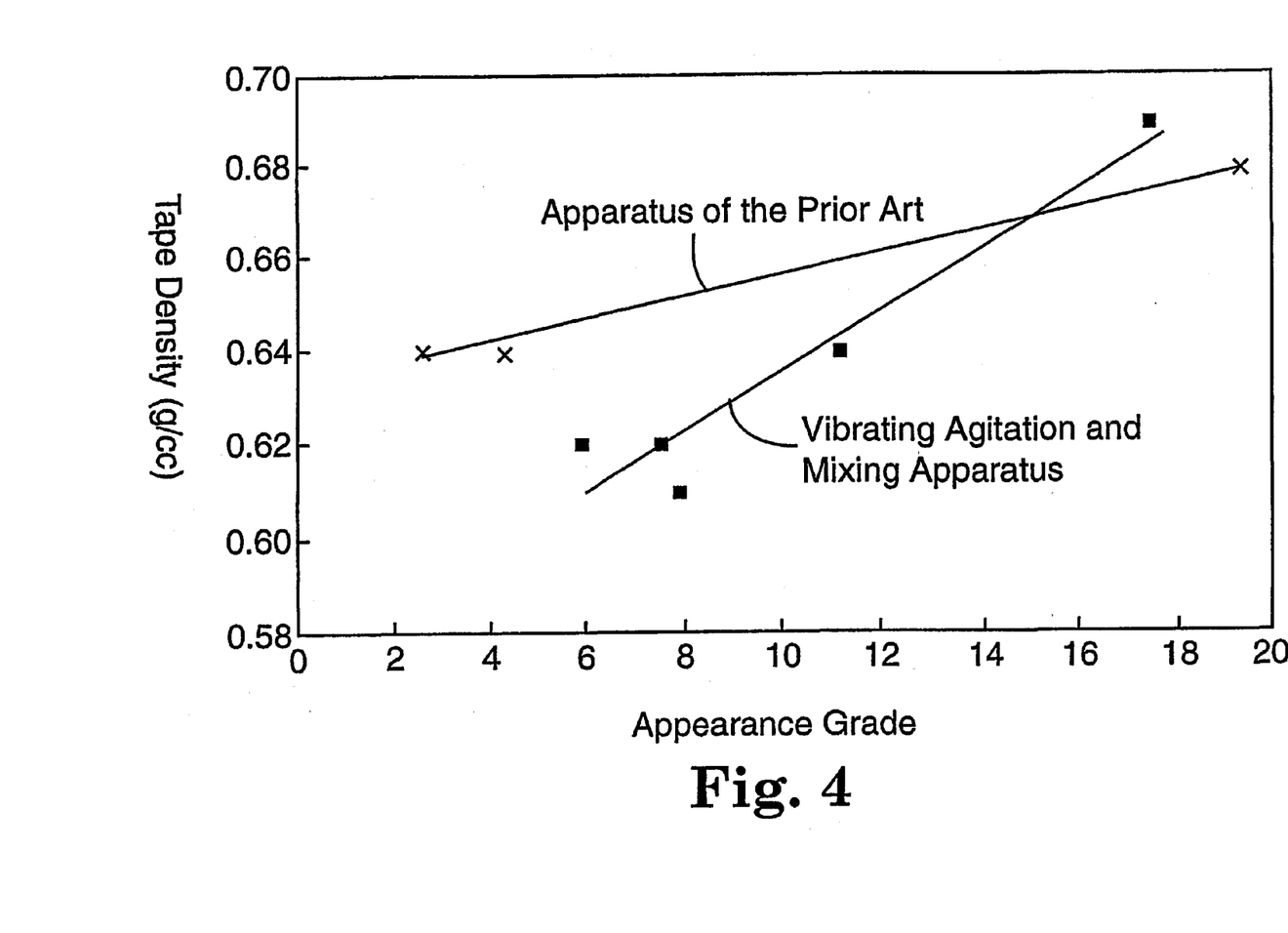
FIG. 4 is a graph showing the relationship between foam density and appearance.

The appearance of the acrylic foam tapes produced in the manner described above were evaluated by grading wherein the acrylic foam precursor compositions were mixed with various amounts of nitrogen gas at 10% by volume or more. The higher the appearance grade, the more satisfactory the appearance. An appearance grade of 7 represents the standard level of current products, while an appearance grade of 3 represents the minimum level of appearance for a finished product. The results for the relationship between foam density and appearance are shown in FIG. 4. As can be understood from FIG. 4, in contrast to the acrylic foam tape having a density of 0.64 g/cc and appearance grade of 3 in the case of using an apparatus of the prior art, the appearance grade was 10 or higher in the case of using a vibrating agitation and mixing apparatus. Thus, the appearance of the foam of the present invention using the vibrating agitation and mixing apparatus was better than that in the case of using the apparatus of the prior art. In addition, it is possible to obtain a foam of lower density that still exhibits the acceptable level of appearance in the case of using the vibrating agitation and mixing apparatus.

Cell Stability Test

Figure 5:
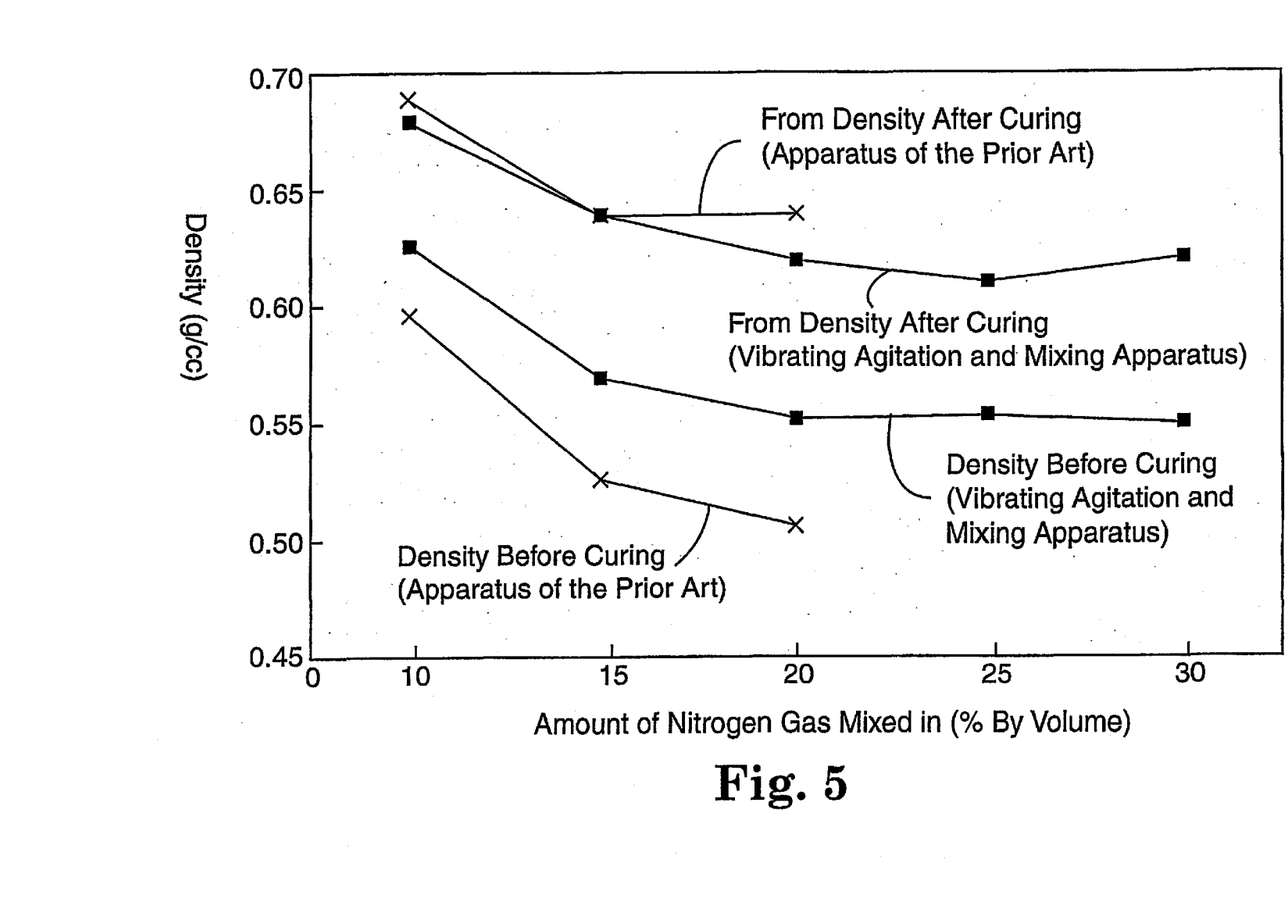
Figure 6:
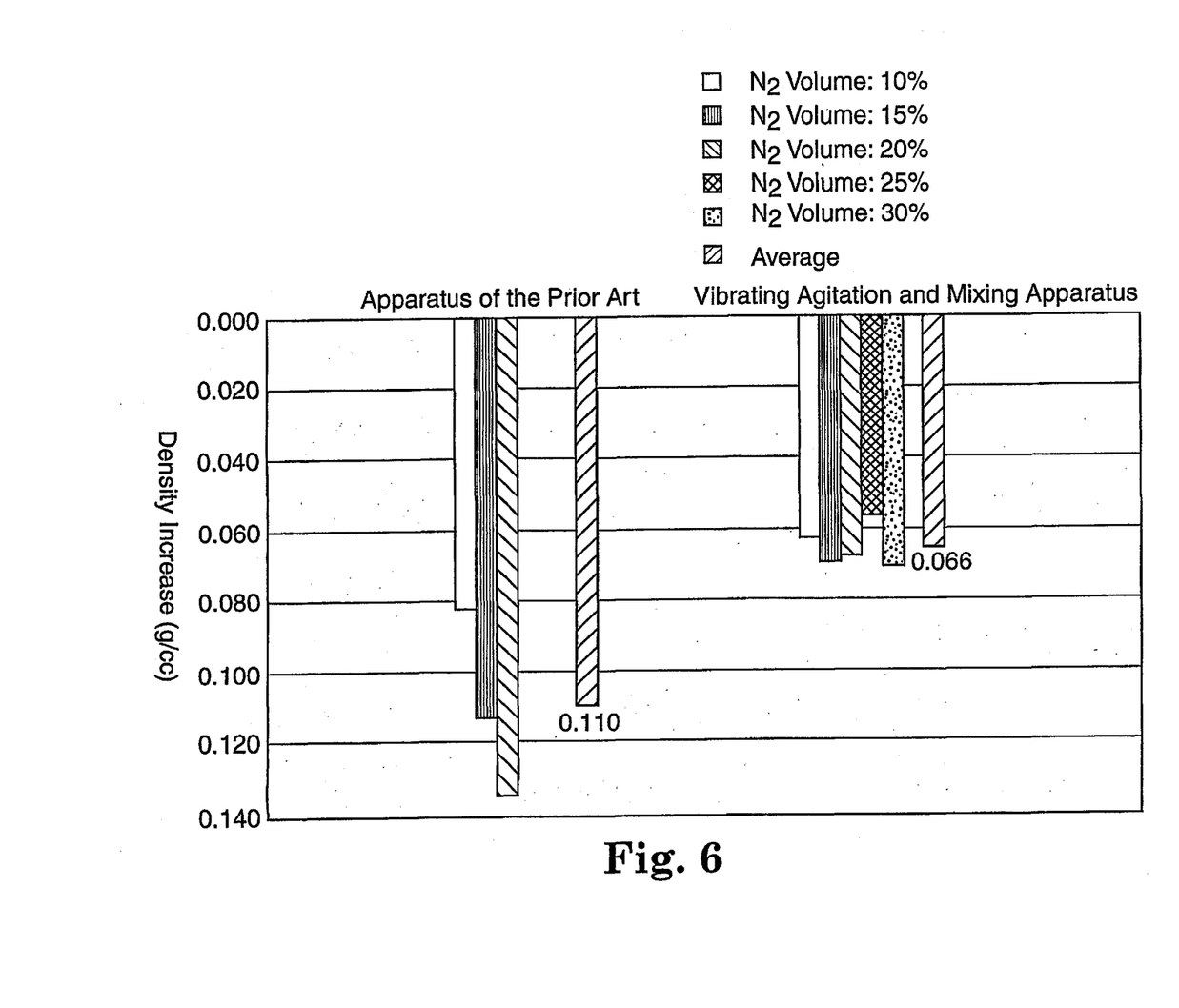
FIG. 6 is a graph showing the amount of change between liquid density before curing and foam density after curing.

The changes between density of the fluid immediately after gas-fluid dispersion but before curing, and the density of the foam tape after curing, were measured for the foams produced in the manner described above mixing in various amounts of nitrogen. FIG. 5 shows the relationship between the volume percentage of the amount of nitrogen gas mixed into the foam precursor composition and density. In addition, FIG. 6 shows the density of the fluid before curing versus the amount of change between the density of the fluid before curing and the density of the foam after curing under conditions of various volume percentages of nitrogen gas. As can be understood from FIGS. 5 and 6, in the case of the apparatus of the prior art, the change between the density immediately after gas-fluid dispersion and the density of the foam after curing was large at 0.110 g/cc on average. On the other hand, in the case of using the vibrating agitation and mixing apparatus, the change in density was small at only 0.066 g/cc. This result can be explained as follows. In the case of using the apparatus of the prior art, cells combine with each other and escape into the atmosphere for a short time during the time the fluid is flowing through the coater bank. On the other hand, in the case of using the vibrating agitation and mixing apparatus, uniform, stable cells having a small diameter are formed, the growth in cell size resulting from combination of the cells is inhibited.

Example 2

In order to obtain a foam tape having a lower density than the density obtained in Example 1, an acrylic foam tape was produced using the same procedure as Example 1 by setting the pressure of nitrogen gas mixed into the vibrating agitation and mixing apparatus at 0.49 MPa and suitably adjusting the amount of nitrogen gas mixed. A foam having a density of 0.647 g/cc was obtained at a frequency of 30 Hz and mixed amount of nitrogen gas of 7% by volume, a foam having a density of 0.584 g/cc was obtained at a frequency of 30 Hz and mixed amount of nitrogen gas of 8% by volume, and a foam having a density of 0.503 g/cc was obtained at a frequency of 30 Hz and mixed amount of nitrogen gas of 10% by volume.

Compressive Load Test

Figure 7:
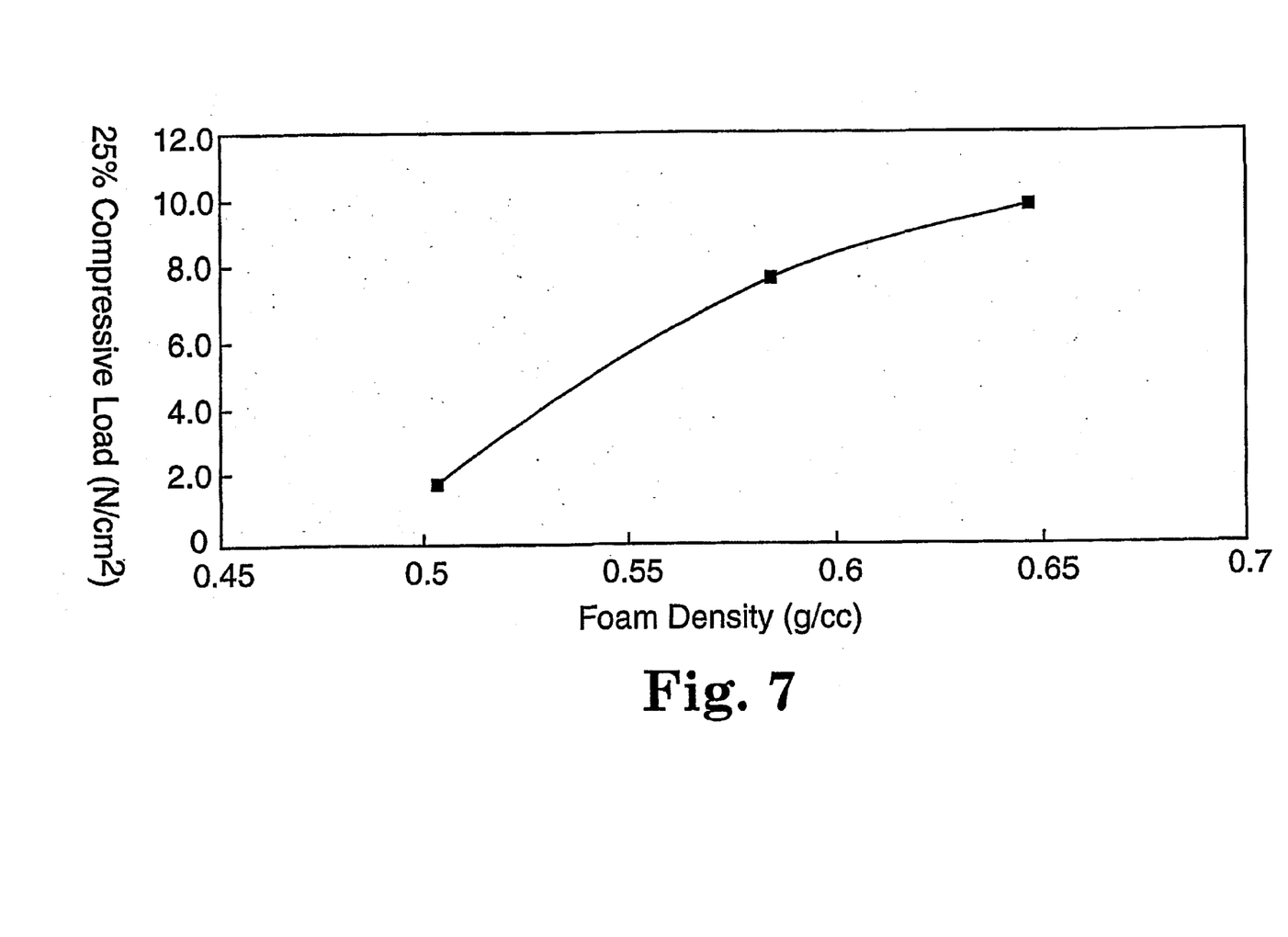
FIG. 7 is a graph showing the relationship between foam density and 25% compressive load.

The load required to compress the resulting foam tape to 75% of its initial thickness in the direction of thickness per unit area (25% compressive load) was measured. The result of expressing the relationship between foam density and 25% compressive load is shown in FIG. 7. As is clear from FIG. 7, foam density and compressive load, which is an indicator of foam softness, maintain a nearly linear relationship such that the lower the foam density, the lower the compressive load and the more superior the adhesion and sealing of the resulting foam. Thus, according to the present invention, since density can be lowered while maintaining a satisfactory appearance, foam tape can be produced offering superior characteristics while also having a satisfactory appearance.

Peeling Adhesion Test

Figure 8:
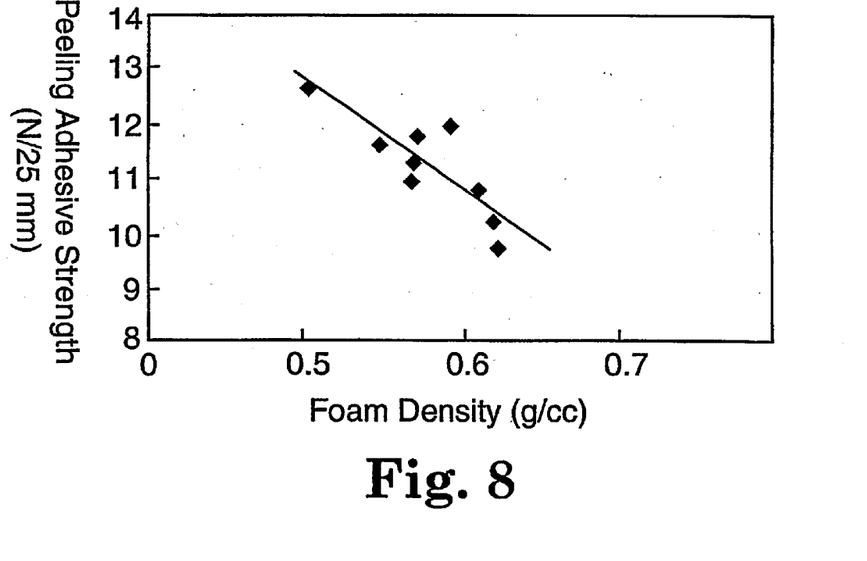
FIG. 8 is a graph showing the relationship between foam density and peeling adhesive strength.

The peeling adhesive strength of the foam tape adhered to a panel was measured. The test sample was formed by pressing the foam tape onto a stainless steel panel coated with melamine alkyd paint at a load of 5 kg using a roller. The sample was then peeled off at a peeling rate of 50 mm/min and peeling angle of 180° in an atmosphere at 80° C. A graph of the results is shown in FIG. 8. As is clear from this graph, it was determined that the lower the density of the foam, the higher the peeling adhesive strength.

End Opening Test

An end opening test was performed in warm water to serve as an indicator of the holding characteristics of the foam with respect to repulsion force. This test was conducted by sandwiching foam measuring 10 mm×50 mm between two adhered plates made of aluminum by pressing at load of 5 kg, forcibly opening up one end of the sample by a predetermined amount, allowing the sample to stand for 100 hours in warm water at 40° C., and checking for the presence of peeling. The relationship between foam density and end opening is shown in Table 1.

TABLE 1

| Sample | Density | Amount of end opening (mm) | | | | |
|---|---|---|---|---|---|---|
|  |  | 1.5 | 2.0 | 2.5 | 3.0 | 3.5 |
| 1 | 0.647 | ○ | ○ | × | × | × |
| 2 | 0.584 | ○ | ○ | ○ | × | × |
| 3 | 0.503 | ○ | ○ | ○ | ○ | ○ |

Note:
○ indicates that there was no occurrence of peeling whatsoever between the foam and adhered plates.
× indicates that peeling occurred between the foam and adhered plates.

On the basis of Table 1, in contrast to the amount of end opening at which the foam was able to hold at the product densities of the prior art being 2.0–2.5 mm, in the low-density product, the foam was able to hold even at an amount of end opening of 3.5 mm, indicating that a foam was able to be obtained that had superior adhesion and flexibility.

According to the present invention, foam is obtained that has higher adhesive strength and lower compressive load (higher cushioning) than foam obtained by the prior art, while also demonstrating superior sealing and adhesion.

Uniform, fine cells are able to be formed even when a large amount of cell forming gas is mixed in, thereby enabling foam products to be obtained having a more satisfactory appearance than methods of the prior art.

Since stable cells are obtained, the amount of surfactant required to obtain an appearance equal to that of the prior art can be reduced. In addition, since dispersion effects on the cell forming gas by the surfactant are remarkable, dispersion is satisfactory and a low-density foam can be obtained even when mixing in a large amount of cell forming gas.

Since the use of the agitation and mixing apparatus according to the present invention enables shearing force applied to the solution during dispersion to effectively contribute to dispersion of the cells, there is hardly any rise in temperature of the solution observed as in the case of apparatuses of the prior art. As a result, combination of cells caused by generation of heat is inhibited resulting in the formation of stable cells.

What is claimed is:

1. A method of producing an acrylic foam pressure sensitive adhesive, said method comprising:
   introducing a mixture of (i) an acrylic foam precursor composition and (ii) a cell forming gas into an agitation and mixing apparatus equipped with (a) a casing provided with a flow path through which the mixture flows, (b) an agitator extending through said casing, and (c) agitation blades disposed within said casing and extending radially from said agitator within said casing;

agitating the mixture as the mixture passes through the flow path by vibrating the agitator and agitation blades, forming cells within the acrylic foam precursor composition;

coating the acrylic foam precursor composition containing the cells onto a substrate; and curing the acrylic foam precursor composition to produce an acrylic foam pressure sensitive adhesive.

2. The method of claim 1, wherein, the acrylic foam pressure sensitive adhesive has a cell average diameter of no more than 300 µm and a standard deviation of no more than 115 µm.

3. The method of claim 1, wherein the acrylic foam pressure sensitive adhesive is formed by a polymerization reaction of an acrylic foam precursor composition comprising a monomer selected from n-propyl(meth)acrylate, n-butyl(meth)acrylate, n-amyl(meth)acrylate, n-hexyl(meth)acrylate, 2-ethylhexyl(meth)acrylate, n-octyl(meth)acrylate, isooctyl(meth)acrylate and n-decyl(meth)acrylate.

4. The method of claim 3, wherein the acrylic foam precursor composition further comprises a monomer selected from acrylic acid, methacrylic acid, itaconic acid, vinyl acetate, hydroxyalkylacrylate, acrylamide and methacrylamide.

5. The method of claim 1, wherein the acrylic foam pressure sensitive adhesive is formed by a polymerization reaction of an acrylic foam precursor composition comprising 100 parts by weight of a (meth)acrylate monomer and up to 30 parts by weight of an acidic monomer, wherein the acidic monomer is selected from acrylic acid, methacrylic acid, itaconic acid, vinyl acetate, hydroxyalkylacrylate, acrylamide and methacrylamide.

6. The method of claim 1, wherein the acrylic foam pressure sensitive adhesive is formed by a polymerization reaction of an acrylic foam precursor composition comprising 1,6-hexanediol diacrylate.

7. The method of claim 1, wherein the acrylic foam pressure sensitive adhesive is formed by a polymerization reaction of an acrylic foam precursor composition comprising a surfactant.

8. The method of claim 7, wherein the surfactant comprises (i) a silicone surfactant containing polydimethylsiloxane and polyether siloxane or (ii) a fluorine surfactant having a molecular formula $C_8F_{17}SO_2N(C_2H_5)(C_2H_4O)_7CH_3$.

9. The method of claim 7, wherein the surfactant is present in an amount of 1 of 5 parts by weight per 100 parts by weight of the foam precursor composition.

10. The method of claim 1, wherein the acrylic foam pressure sensitive adhesive has a cell average diameter that is no more than 250 µm, and the standard deviation is no more than 100 µm.

11. The method of claim 1, wherein the acrylic foam pressure sensitive adhesive has a foam density of no more than 0.6 g/cc.

12. The method of claim 1, wherein the acrylic foam pressure sensitive adhesive has a foam density of no more than 0.55 g/cc.

13. The method of claim 1, wherein the acrylic foam pressure sensitive adhesive has a foam density of no more than 0.5 g/cc.

14. The method of claim 1, wherein the acrylic foam pressure sensitive adhesive has a foam density of no more than 0.45 g/cc.

15. The method of claim 1, wherein the acrylic foam pressure sensitive adhesive has a foam density of no more than 0.40 g/cc.

16. The method of claim 1, wherein the substrate is a base film substrate.

17. The method of claim 16, wherein base film substrate is a transparent film.

18. The method of claim 1, wherein the agitator is vibrated at an amplitude of from 0.5 to 5 cm and a frequency of from 0 to 120 Hz.

19. The method of claim 1, wherein the acrylic foam precursor composition has a viscosity of from 500 mPa·s to 100,000 mPa·s at 25° C.

20. The method of claim 1, wherein the acrylic foam precursor composition is partially polymerized prior to being introduced into the agitation and mixing apparatus to obtain a partially polymerized acrylic foam precursor composition capable of containing stable cells therein.

21. The method of claim 1, wherein the curing step comprises a polymerization reaction.

* * * * *

UNITED STATES PATENT AND TRADEMARK OFFICE
CERTIFICATE OF CORRECTION

PATENT NO. : 6,746,725 B2
DATED : June 8, 2004
INVENTOR(S) : Nakamuta, Shojitsu

It is certified that error appears in the above-identified patent and that said Letters Patent is hereby corrected as shown below:

Title page,
Item [30], Foreign Application Priority Data, insert -- JP 2000-274047   August 31, 2000 --;

Column 3,
Line 21, delete "mPa S", insert in place thereof -- mPa s --;

Column 5,
Line 39, delete "15", insert in place thereof -- 115 --;

Column 6,
Line 5, after "silica" insert -- , --;
Line 39, delete "nm", insert in place thereof -- mm --;

Column 10,
Line 7, delete "1 of 5", insert in place thereof -- 1 to 5 --.

Signed and Sealed this

Thirty-first Day of August, 2004

JON W. DUDAS
*Director of the United States Patent and Trademark Office*